(12) United States Patent
Jansen

(10) Patent No.: US 12,228,633 B2
(45) Date of Patent: Feb. 18, 2025

(54) RADAR COMMUNICATIONS WITH SCANNING AND FIXED SIGNAL CODES

(71) Applicant: NXP B.V., Eindhoven (NL)

(72) Inventor: Feike Guus Jansen, Eindhoven (NL)

(73) Assignee: NXP B.V., Eindhoven (NL)

( * ) Notice: Subject to any disclaimer, the term of this patent is extended or adjusted under 35 U.S.C. 154(b) by 422 days.

(21) Appl. No.: 17/491,927

(22) Filed: Oct. 1, 2021

(65) Prior Publication Data
US 2023/0103471 A1    Apr. 6, 2023

(51) Int. Cl.
*G01S 13/42*    (2006.01)
*G01S 13/32*    (2006.01)

(52) U.S. Cl.
CPC .......... *G01S 13/426* (2013.01); *G01S 13/325* (2013.01)

(58) Field of Classification Search
CPC .............................. G01S 13/426; G01S 13/325
See application file for complete search history.

(56) References Cited

U.S. PATENT DOCUMENTS

| | | | |
|---|---|---|---|
| 9,448,303 B2 * | 9/2016 | Kishigami | G01S 13/284 |
| 9,933,520 B1 * | 4/2018 | Campbell | G01S 13/42 |
| 10,826,594 B2 | 11/2020 | Campos et al. | |
| 2015/0226848 A1 * | 8/2015 | Park | G01S 13/584 |
| | | | 342/93 |
| 2018/0212670 A1 * | 7/2018 | Campos | H04L 27/2601 |
| 2020/0044336 A1 * | 2/2020 | Dani | H03F 3/211 |
| 2020/0225337 A1 * | 7/2020 | Kishigami | G01S 7/41 |
| 2022/0003835 A1 * | 1/2022 | Iwasa | G01S 13/288 |
| 2022/0099837 A1 * | 3/2022 | Crouch | G01S 17/931 |
| 2022/0308160 A1 * | 9/2022 | Dent | G01S 7/2813 |
| 2023/0036918 A1 * | 2/2023 | Arakawa | G01S 13/42 |

OTHER PUBLICATIONS

Pfeffer ("A multimode-beamforming 77-GHz FMCW radar system," 2013 IEEE MTT-S International Microwave Symposium Digest (MTT), Seattle, WA, USA, 2013, pp. 1-4) (Year: 2013).*
C. Pfeffer, R. Feger, C. Wagner and A. Stelzer, "A Multimode-Beamforming 77-GHz FMCW Radar System," 2013 IEEE MTT-S International Microwave Symposium Digest (MTT), 2013, pp. 1-4.
De Wit, J.J.M., "Orthogonal Waveforms for FMCW MIMO Radar", Radar Conference (RADAR), IEEE, May 23, 2011.

* cited by examiner

*Primary Examiner* — Vladimir Magloire
*Assistant Examiner* — Noah Yi Min Zhu

(57) ABSTRACT

Aspects of the present disclosure are directed to radar transmissions and related componentry. As may be implemented in accordance with various embodiments, radar signals are generated and transmitted using both scanning and fixed beam analog signal codes concurrently/as combined for each radar signal. Reflections of the radar signals from a target are processed for ascertaining positional characteristics of the target.

20 Claims, 4 Drawing Sheets

RADAR COMMUNICATIONS WITH SCANNING AND FIXED SIGNAL CODES

OVERVIEW

Aspects of various embodiments are directed to radar communications involving respective radar signals, each signal utilizing both fixed and scanning beam signals.

A variety of radar communications may be utilized for many different applications. For instance, automotive radar systems may measure the direction of arrival of reflective objects exploiting path length differences between multiple transmit and receive antennas. Coding of radar signals may be used to distinguish the signals emitted by different transmit antennas. When the transmitters are transmitting simultaneously in a frequency division fashion, a transmit beam scans the space in front of the transmit antenna array (e.g., using a multiple-in-multiple-out (MIMO) radar scheme).

While useful, such approaches may result in low received signal power as the beam may be pointed towards the target for a fraction of the measurement time. In contrast, if the transmit radiation beam is pointed towards the target for the entire duration of the measurement, a higher received power is realized. However, in this latter case it may not be possible to distinguish the multiple transmit antennas from each other. These and other matters have presented challenges to efficiencies and operation of radar implementations, for a variety of applications.

SUMMARY

Various example embodiments are directed to issues such as those addressed above and/or others which may become apparent from the following disclosure, which may involve radar signaling utilizing a combination of different types of codes/inputs for generating each signal. In certain example embodiments, aspects of the present disclosure involve radar signal transmission utilizing both fixed and scanning beam components as combined for each signal to produce an output signal having characteristics of both components.

In a particular embodiment, a method for use in a radar apparatus is carried out as follows. Radar signals are transmitted, including generating and transmitting radar signals using both scanning and fixed beam analog signal codes concurrently for each radar signal. Reflections of the radar signals from a target are processed and, in response thereto, positional characteristics of the target are ascertained. For instance, MIMO and fixed beamforming outputs can be generated and combined to be used simultaneously in a particular radar signal. Further, characteristics of such a combination (e.g., as relevant to a phase rotator) may be utilized to identify one of a plurality of transmitters from which related reflections are received, and therein to facilitate characterizing positional aspects of the target.

In another specific example embodiment, an apparatus comprises transmission circuitry and processing circuitry. The transmission circuitry is to transmit radar signals, including generating and transmitting radar signals using both scanning and fixed beam analog signal codes concurrently for each radar signal. The processing circuitry is to process the reflections of the radar signals from a target and, in response thereto, ascertain positional characteristics of the target.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
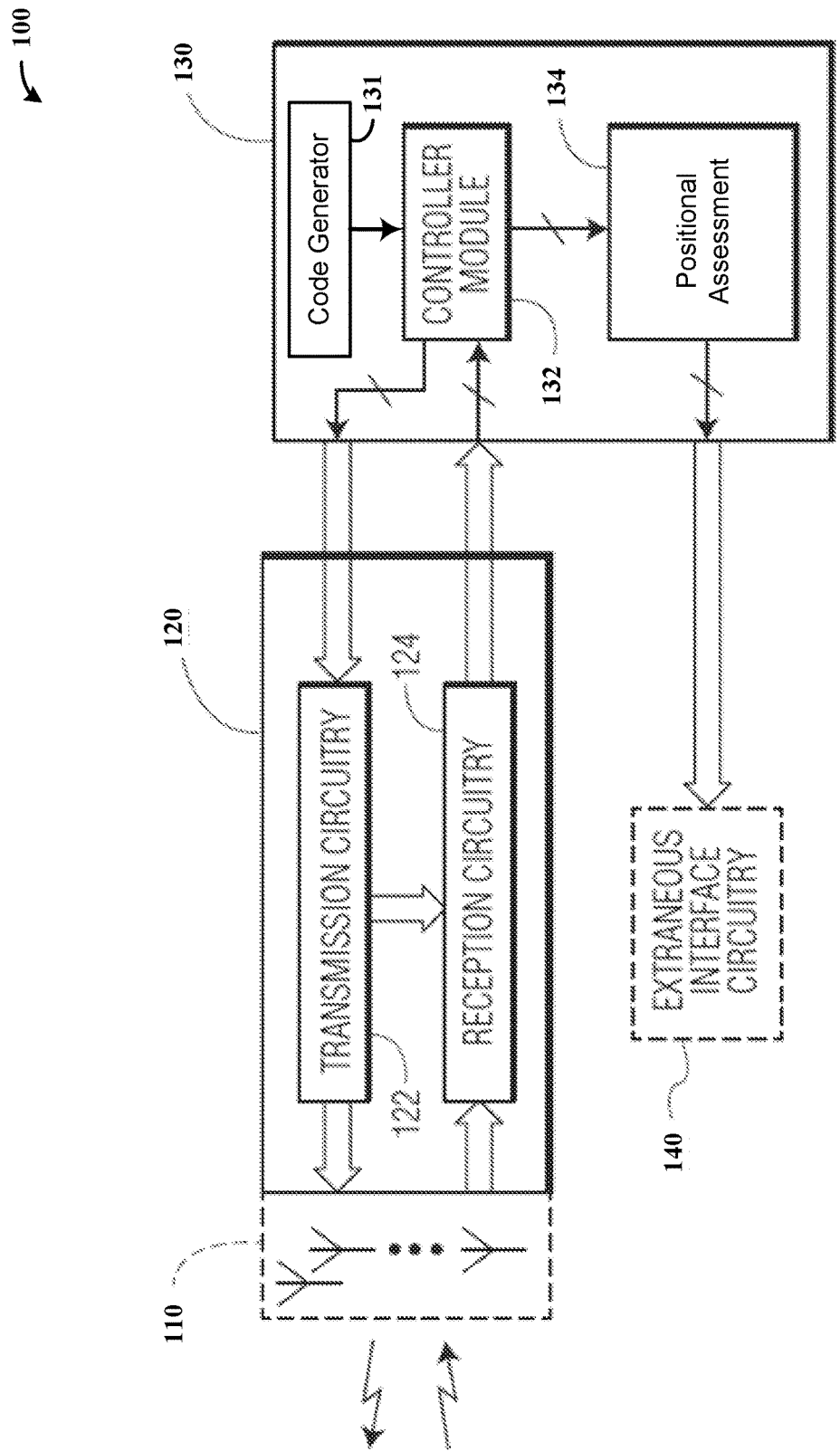
FIG. 1 shows a radar apparatus, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving radar communications and related circuitry, as may be utilized in automotive and other applications. In certain implementations, aspects of the present disclosure have been shown to be beneficial when used in the context of automotive signaling applications in which multiple antennas are used, and in which radar reflections corresponding to signals from each antenna may be distinguished. In some embodiments, scanning and fixed beams are combined in a single measurement by generating phase rotations and amplitudes in a phase rotator, with a vectorial addition of both scanning and fixed beam signal codes. The technique may, for example, facilitate radar energy focus to areas of interest while simultaneously keeping track of a field of view. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Various aspects of the disclosure are directed to a multiple transmitter radar system that combines a changing transmit MIMO code with a fixed beamforming code where the fixed code has a non-changing phase relationship between transmit antennas during the radar measurement. Other aspects are directed to a radar system in which a single changing code is combined with multiple fixed codes in which the phase relationship between respective transmit antennas is fixed for the duration of the measurement while allowing the common phase to change from chirp to chirp. Another aspect is directed to a radar transmitter in which a changing MIMO code is added to a fixed code in a transmit phase rotator, with the addition resulting in an amplitude that changes with every combination of fixed and changing code.

As may be implemented with one or more embodiments as characterized above, certain particular embodiments are directed to a power amplifier that operates at different levels of transmit power with high linearity using pre-distortion compensation of a non-linear gain characteristic. Some embodiments involve a radar signal processor that distinguishes between signals originating from individual transmit antennas and one or more combinations of transmit antennas by performing a matched filter operation on the received signal. Still other embodiments are directed to a radar signal processor that utilizes differences in received power between MIMO encoded and beamforming encoded signals to resolve an ambiguity in the angular domain.

In a particular embodiment, a radar system is equipped with multiple receive antennas that can be used to estimate the direction under which a reflected signal has been received, which may be referred to as the direction of arrival (DOA). This is based upon the difference in time of flight between the target and the different receiver antennas. Such a signal may be sufficiently narrowband such that the time delay is approximated by a phase shift at the carrier frequency. Multiple transmitters are implemented for encoding fixed and variable signals, with signal processing on the receiver side operable for decoding/processing the mixed signals.

A particular beamforming aspect of the disclosure is carried out as follows. Assuming $N_{tx}$ antennas placed on a line with spacing $d_{tx}$ equal to half a wavelength of the carrier frequency, and assuming that the signal to be utilized is sufficiently narrowband to approximate the time delay with a phase shift at the carrier frequency, the direction to which a beam is to be formed is given by $\varphi_{target}$. A beam can be formed to this direction by applying the following relative phase shifts to signals feeding the transmit antennas:

$$\varphi_{steer}(n) = 360(n-1)\frac{d_{tx}f_c}{c_0}\sin(\varphi_{target}) = 180(n-1)\sin(\varphi_{target})$$

Another coding aspect involves orthogonal coding of transmitters which may facilitate separation of signals originating from the different transmitters at the receiver side. Because all transmit and receive antenna combinations are available, a virtual array can be formed to include a number of elements equal to the product of the number of transmit and receive antennas.

Accordingly, various embodiments are directed to an encoding technique in which various transmitters emit a waveform simultaneously, and in which receiver antennas receive a signal that is the summation of all transmitted waveforms. Each of "M" transmitters may modulate each waveform with a linearly increasing phase shift. For example, such a transmitter may apply the following phase shifts:

$$\varphi_n = \exp(j\varphi_m n) \text{ for } n = 0, 1, \ldots N_{chirp}-1$$

which can be rewritten in the following form:

$$\varphi_n = \exp\left(j2\pi m \frac{F_{PRF}}{M} T_{chirp} n\right) \text{ for } n = 0, 1, \ldots N_{chirp}-1$$

where $F_{PRF} = T_{chirp}^{-1}$ Then, the signal transmitted by antenna "M" can be written as:

$$s(t) = \Re\left\{\sum_{n=0}^{N-1} rect\left(\frac{t - \frac{1}{2}T - nT}{T}\right) \exp\left(j2\pi f_{center}(t - nT) + j2\pi m \frac{F_{PRF}}{M} T_{chirp} + j\pi\mu(t - nT)^2\right)\right\}$$

The above aspects may be implemented utilizing a variety of waveforms, such as a frequency-modulated continuous wave (FMCW) waveform.

The phase coding inserted in the transmitted signal may be left out in a version of the signal used for down conversion (e.g., where the transmitted signal is also supplied directly to receiver circuitry in the same station). Accordingly, the encoding shifts the Doppler spectrum with $1/MF_{PRF}$ Hz with respect to an unencoded signal. A second transmitter that doesn't include the phase shift may be added. The Doppler spectrum corresponding to this transmitter will be located at the original location without frequency offset. This technique may be implemented in accordance with Doppler Division Multiple Access (DDMA), where the signals emitted by different antennas are separated in the Doppler frequency domain.

The Doppler spectrum may be divided in M parts, in which the spectral width of each part is calculated as $$B = \frac{1}{MT_{chirp}}$$

The signals originating from the different transmitters may thus be distinguished in the Doppler spectrum. Formation of a virtual array may be achieved by concatenating the sets of transmit responses from multiple receive antennas. The transmit antennas may be spaced by half a wavelength and the receive antennas may be spaced by the length of the transmit array. A related coding matrix for a 4 transmitter system may be given as shown in Table 1:

TABLE 1

| Chirp transmitter/index | 1 | 2 | 3 | 4 |
|---|---|---|---|---|
| 1 | 0 | 0 | 0 | 0 |
| 2 | 0 | 90 | 180 | 270 |
| 3 | 0 | 180 | 0 | 180 |
| 3 | 0 | 270 | 180 | 90 |

Such a table may be implemented as a DDMA coding table with the chirp index depicted in the rows. The matrix may be repeated until the end of the measurement. Further, these codes may correspond to the following beamsteering directions, as may be implemented with a calibrated array with equal phase lengths:

Chirp 1⇒0 deg. Phase shift⇒0 deg.
Chirp 2⇒90 deg. Phase shift⇒30 deg.
Chirp 3⇒180 deg. Phase shift⇒90 deg.
Chirp 4⇒−90 deg. Phase shift⇒−30 deg.

Utilized as such, the transmit array may illuminate the field of view (FOV) with deterministic patterns that cyclically change direction.

In a more particular embodiment, MIMO and beamforming modes are combined by simultaneously transmitting a signal with a MIMO codeword and a signal with a beamforming codeword. Additional codes may be used to distinguish the effective beamforming signal from the MIMO codewords. For example, in 4 transmitter cases, a coding for 8 transmitters can be used with four Doppler frequency offsets assigned to the 4 transmitters, with 3 Doppler frequency offsets assigned to beamforming codes, and one code left unused for detecting cyclic rotation of the Doppler spectrum due to ambiguous Doppler measurements.

In certain approaches, angular ambiguities may be resolved by comparing power received in a MIMO mode to that of a beamforming mode. If the received power in the beamforming mode exceeds the received power in the MIMO mode, it can be concluded that the target is located in a pre-defined angular region. This region may be pre-defined in the sensor design. This pre-defined region may encompass a single angular alias, which may be utilized to identify a correct DOA via the power ratio. If received power in the MIMO mode exceeds the received power in beamforming mode, regular MIMO processing can be used (e.g., to provide a signal without ambiguities). In connection with such embodiments, it has been recognized/discovered that the angular width of regions with increased received signal power in the beamforming mode is always wider than the width of the unambiguous angular region. Accordingly, a power threshold may be defined based upon the received signal power received in the MIMO mode to aid in the fine tuning of the angular region associated to the beamforming mode. As such, adding a beamforming code with MIMO code may increase maximum sensor distance and high resolution in the angular region may be realized for which increased maximum sensor distance has been achieved.

In a particular embodiment, radar signals are generated and transmitted using both scanning and fixed beam analog signal codes concurrently for each radar signal. For instance, scanning and fixed beam outputs may be provided to an analog signal generator and the outputs may be combined to produce the radar signals having both scanning and fixed beam signal codes. As another example, respective signals exhibiting different phase rotations may be generated by vectorially adding scanning and fixed beam codes, and/or by generating respective signals exhibiting different phase rotations. Reflections of the radar signals from a target are used for ascertaining positional characteristics of the target. The reflections of the radar signals may be processed by decoding the transmitted radar signals and, for each decoded radar signal, identifying one of a plurality of transmitters from which the radar signal is received based on the scanning and fixed beam signal codes used for the respective transmitters. Further, a beamforming code may be identified with Doppler offsets, such as in using Doppler frequency offsets assigned to respective transmitters as discussed above.

The radar signals may be generated in a variety of manners. In some implementations, a fixed beamforming output and variable MIMO outputs are generated, with each MIMO output having a phase pattern that is different than the phase of the other MIMO outputs. The fixed beamforming output and one of the MIMO outputs are combined to provide a radar signal to be transmitted. For instance, the fixed beamforming output and the MIMO output may be vectorially added, such as by combining the outputs in the analog domain using a phase rotator to produce a combined signal. The combined signal may be amplified to apply different levels of transmit power using pre-distortion compensation of a non-linear gain characteristic. As referred to here and otherwise herein, analog signal codes involve codes that are combined in the analog domain, for example as provided to and output from an analog signal generator.

In another embodiment, a fixed beamforming output and variable MIMO outputs are generated for each of a plurality of transmitters with the MIMO output for each transmitter having phase pattern that is different than the phase pattern of the MIMO output of another of the transmitters. For each of the plurality of transmitters via which the radar signals are transmitted, the radar signals are transmitted as a vectorial addition of the fixed beamforming output and the MIMO output for that transmitter.

The radar signals may be generated to produce reflections having different values in the Doppler frequency domain, each value corresponding to a unique Doppler shift exhibited by a transmitter from which the radar signals are transmitted. The reflections may be processed by identifying the transmitter from which the reflections of the radar signals are transmitted.

Another embodiment is directed to an apparatus comprising transmission circuitry and processing circuitry as may carry out the operations noted above. The transmission circuitry is configured transmit radar signals using both scanning and fixed beam analog signal codes concurrently for each radar signal. For instance, the transmission circuitry may generate respective scanning and fixed beam signal codes exhibiting different phase rotations. The processing circuitry is configured to process the reflections of the radar signals from a target and, in response thereto, ascertain positional characteristics of the target. The processing circuitry may process the reflections of the radar signals by decoding the transmitted radar signals and, for each decoded radar signal, identifying one of a plurality of transmitters from which the radar signal is received based on the scanning and fixed beam signal codes used for the respective transmitters.

The transmission circuitry may generate the radar signals in a variety of manners. For instance, a fixed beamforming output and variable MIMO outputs may be generated in which each MIMO output has phase pattern that is different than the phase pattern of the other MIMO outputs. The fixed beamforming output and one of the MIMO outputs may be combined to provide a radar signal to be transmitted, such as by vectorial addition. For instance, the outputs may be combined in the analog domain using a phase rotator to produce a combined signal, and an amplifier may be used to amplify the combined signal by applying different levels of transmit power using pre-distortion compensation of a non-linear gain characteristic.

In other implementations, the transmission circuitry provides scanning and fixed beam outputs to an analog signal generator, and vectorially adds the scanning and fixed beam analog signal codes to produce the radar signals concurrently exhibiting both scanning and fixed beam signal codes. In a particular implementation, the transmission circuitry may generate the radar signals to produce reflections having different values in the Doppler frequency domain, each value corresponding to a unique Doppler shift exhibited by a transmitter from which the radar signals are transmitted, with the processing circuitry operable to process the reflections of the radar signals includes identifying the transmitter from which the reflections of the radar signals are transmitted. In addition, each beamforming code may have its own Doppler shift.

Turning now to the Figures, FIG. 1 shows a radar apparatus 100 as may be implemented in accordance with one or more embodiments. The apparatus 100 includes an antenna array 110, radar communication circuitry 120, and radar processing circuitry 130 (which may further interface with interface circuitry 140, for example automotive interface circuitry). The antenna array 110 includes a plurality of antennas, and the radar communication circuitry 120 includes transmission circuitry 122 and reception circuitry 124 (e.g., a plurality of transmitters and receivers). The radar processing circuitry 130 (e.g., radar MCPU) includes a controller module 132 and positional assessment circuitry 134.

The transmission circuitry 122 is configured to generate combined signals using fixed and scanning codes as characterized herein. For instance, in respective embodiments, the transmission circuitry 122 is implemented in accordance with the apparatuses as shown and characterized in FIGS. 2 and 3.

Figure 2:
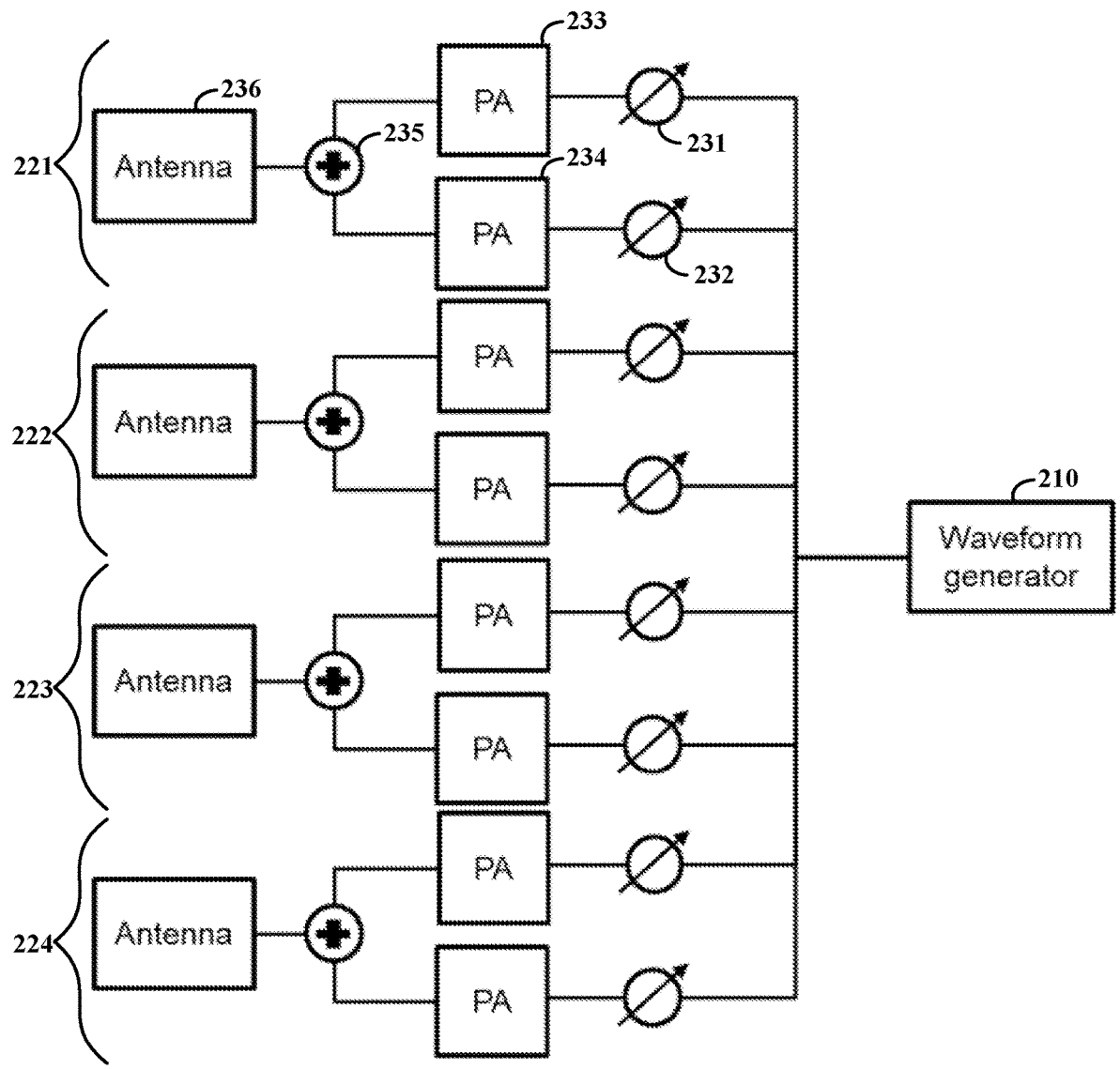
FIG. 2 shows an apparatus for combining fixed and MIMO codewords, in accordance with the present disclosure.

FIG. 2 shows an apparatus 200 for combining fixed and MIMO codewords, in accordance with one or more embodiments. The apparatus 200 uses multiple transmit codewords simultaneously, with a signal corresponding to these words summed before the transmit antenna. The apparatus 200 includes a waveform generator 210 and four sets of transmitter circuitry 221, 222, 223 and 224. Transmitter circuitry 221 is labeled by way of example, and includes code generators 231 and 232 that respectively provide outputs (e.g., fixed and variable) to power amplifiers 233 and 234. An adder circuit 235 combines the outputs of the power amplifiers 233 and 234, and provides the combined outputs to antenna 236.

Figure 3:
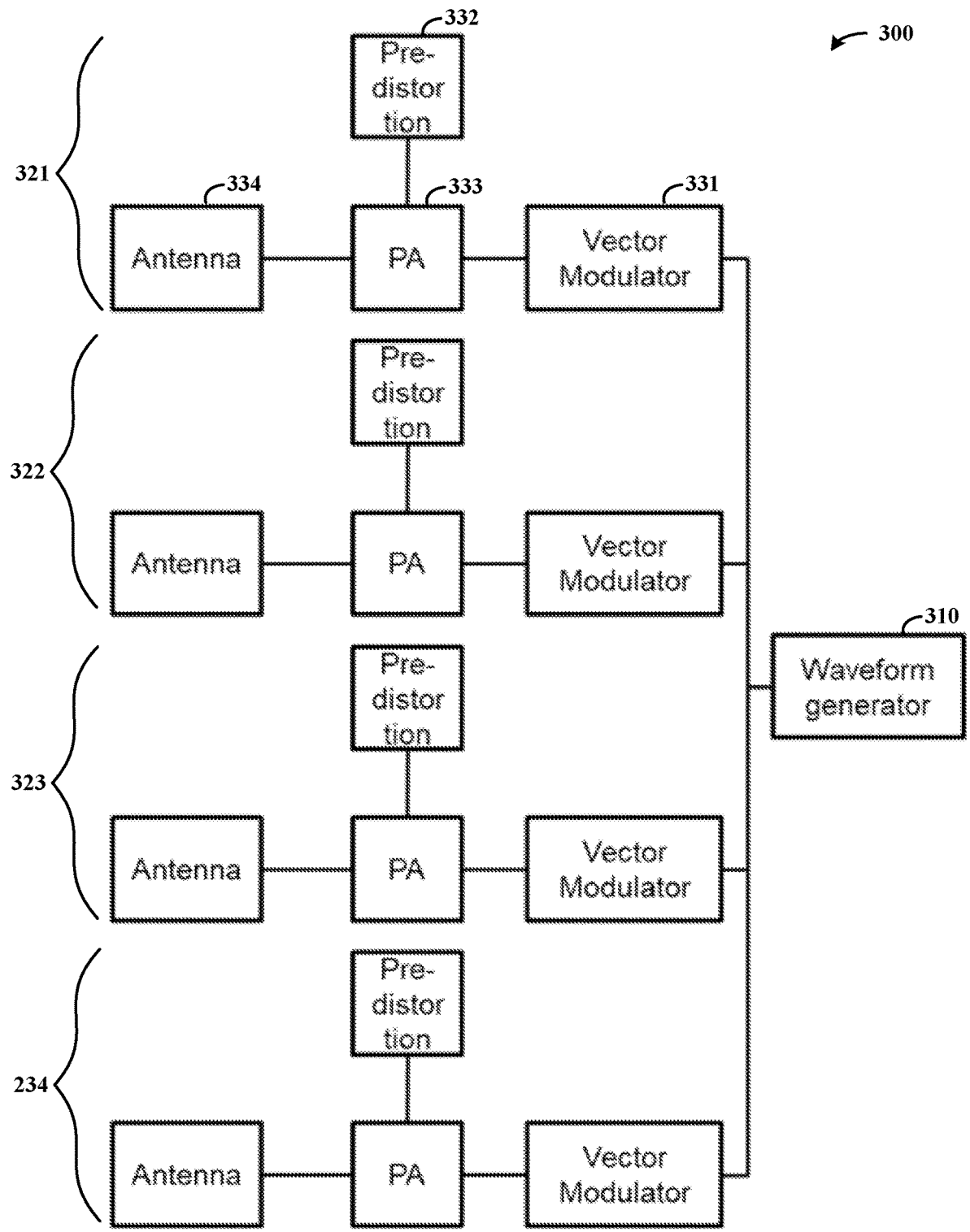
FIG. 3 shows another apparatus for combining fixed and MIMO codewords, in accordance with the present disclosure.

FIG. 3 shows another apparatus 300 for combining fixed and MIMO codewords, in accordance with one or more embodiments. The apparatus includes a waveform generator 310 and four sets of transmitter circuitry 321, 322, 323 and 324. With transmitter 321 labeled by way of example, each transmitter includes a vector modulator 331, pre-distortion compensation circuit 332, and power amplifier 333 that provides an output to an antenna 334. Four transmitters are shown by way of example, with fewer or more transmitters used to apply to certain implementations. For instance, where a beamforming mode is utilized in a four-transmitter system, three transmitters may be utilized for MIMO/beamforming combination.

Phase rotators may be utilized, with multiple codewords being added in a phase rotator provided by the vector modulators and a single signal supplied to the power amplifier and antenna in each transmitter. For instance, the vector modulator 331 may add fixed and MIMO codes as noted herein, which may add constructively or destructively, leading to varying signal power (e.g., effectively introducing variable amplification of the signal).

Figure 4:
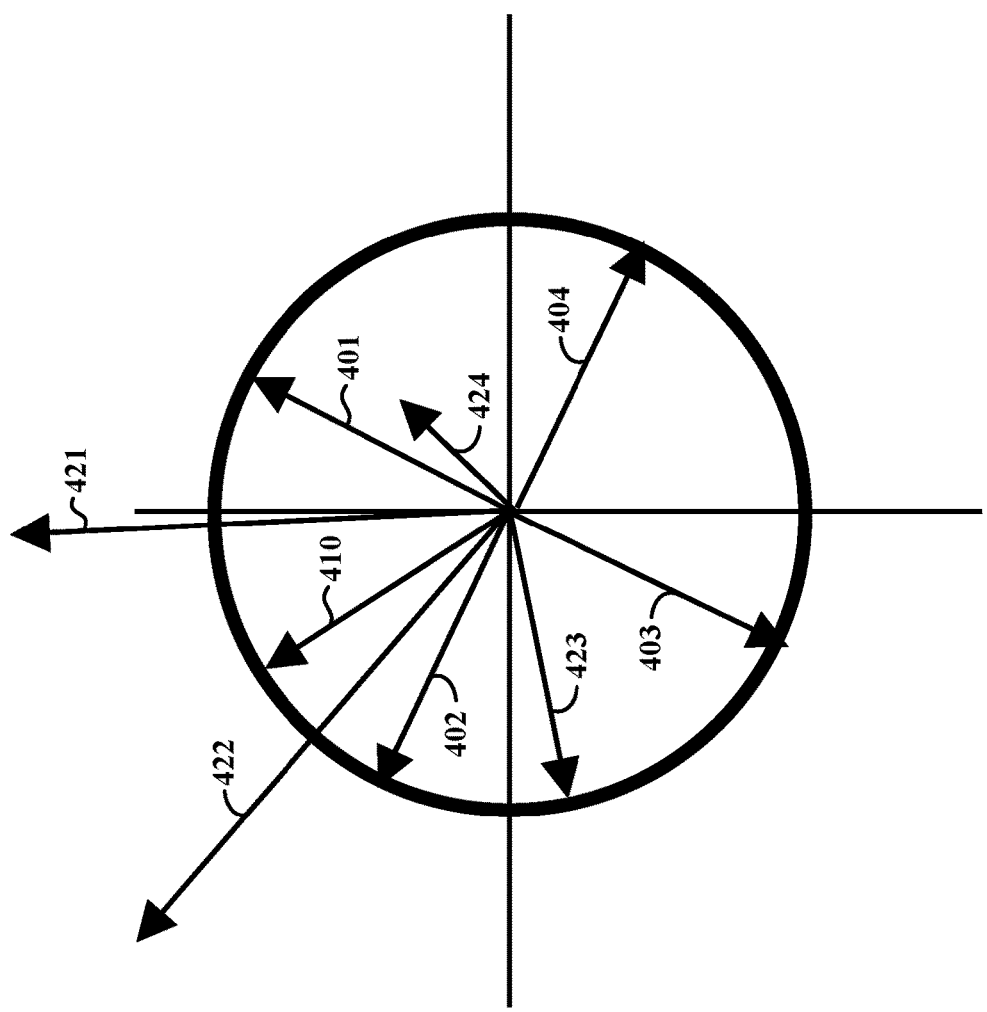
FIG. 4 shows an approach to adding fixed and beamforming codes, in accordance with the present disclosure.

FIG. 4 show an approach to adding codes, as may be implemented in accordance with one or more embodiments (e.g., in connection with FIG. 3). The relative angle between the MIMO code elements and the fixed beamforming code element can be changed to control variation of output power. For instance, the power ratio between the codes can be changed to limit the variation of the vector modular output power.

Variable MIMO code inputs are shown as vectors 401, 402, 403 and 404, which are combined with a fixed beamforming code input 410. This respectively produces total output codes 421, 422, 423 and 424. These codes may thus correspond to a single transmitter, and may be transmitted in time with varying signal power.

Aa may be implemented with an approach such as that shown in FIG. 4, a phase rotator output may be provided for four different waveforms (each waveform having one of four codes associated to it). This approach may be implemented with transmitters utilizing the following codes:
1) Transmitter 1: two vector 180 deg step [0,180] deg phase shift+beamforming vector 1;
2) Transmitter 2: four vector +90 deg step [0,90,180,270] deg phase shift+beamforming vector 2; and
3) Transmitter 3: four vector −90 deg step [0 270 180 90] deg phase shift+beamforming vector 3.

FIG. 4 may thus depict transmitter 2 or 3 in this context. The beamforming vector may represent the phase and gain needed to form the transmit beam in the desired direction. A 0 (zero) degree phase shift code (or another assigned code that is the same for all transmitters) may be assigned to a beamforming mode. Such an approach may, for example, be carried out in connection with FIG. 2 or 3 (e.g., with a transmitter being removed, if desired).

As may be implemented with FIG. 3 or otherwise herein, the output of the phase rotator has a power that varies from waveform (chirp) to waveform, which may be provided to a power amplifier. Pre-distortion (e.g., at 332) can be utilized to linearize the output power in order to reduce the appearance of spurs in the received signal spectrum. Such a pre-distortion technique can be based upon a look up table where the gain values are pre-calculated in such a way that they compensate the non-linear behavior. This may mitigate compression of the gain of the power amplifier when the output power approaches maximum output power. In a particular example, a back of around 3 dB may be utilized for two codes, with the 3 dB value relevant to numerical simulations as the ratio between peak and average power.

As examples, the specification describes and/or illustrates aspects useful for implementing the claimed disclosure by way of various circuits or circuitry which may be illustrated as or using terms such as blocks, modules, device, system, unit, controller, code generator, waveform generator, vector modulator, and/or other circuit-type depictions (e.g., reference numerals and 310, 331, and 332 of FIG. 3 may depict a block/module as described herein). Such circuits or circuitry are used together with other elements to exemplify how certain embodiments may be carried out in the form or structures, steps, functions, operations, activities, etc. As examples, wherein such circuits or circuitry may correspond to logic circuitry (which may refer to or include a code-programmed/configured CPU), in one example the logic circuitry may carry out a process or method (sometimes "algorithm") by performing code combination, vector modulation, and such. Yet another process or method in this context would be recognized in connection with the functions/activities associated with the phase rotators shown in FIGS. 4 and 5.

For example, in certain of the above-discussed embodiments, one or more modules are discrete logic circuits or programmable logic circuits configured and arranged for implementing these operations/activities, as may be carried out in the approaches shown in FIGS. 2 and 3. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described herein is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to various circuits or processed in order (e.g., a "first set of MIMO codes"), the adjectives "first" and "second" are not used to connote any description of the structure or method to provide any substantive meaning; rather, such adjectives are merely used for English-language antecedence to differentiate one such similarly-named structure from another similarly-named structure.

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. As another example, fewer or more transmitters may be utilized. As a further example, additional sets of MIMO codes may be utilized. Such modifications do not depart from the true spirit and scope of various aspects of the disclosure, including aspects set forth in the claims.

What is claimed is:

1. For use in a radar apparatus, a method comprising:
    transmitting radar signals, including generating and transmitting radar signals using both scanning and fixed beam analog signal codes concurrently for each radar signal, wherein the analog signal codes comprise codes that are combined in the analog domain; and
    processing, by way of positional assessment circuitry, reflections of the radar signals from a target and, in response thereto, ascertaining positional characteristics of the target.

2. The method of claim 1, wherein generating the radar signals includes:
    generating a fixed beamforming output;
    generating variable multi-input multi-output (MIMO) outputs, each MIMO output having a phase pattern that is different than the phase pattern of the other MIMO outputs; and
    combining the fixed beamforming output and one of the MIMO outputs to provide a radar signal to be transmitted.

3. The method of claim 1, wherein generating the radar signals includes:
    generating a fixed beamforming output;
    generating variable MIMO outputs for each of a plurality of transmitters, the MIMO output for each transmitter having a phase pattern that is different than the phase pattern of the MIMO outputs for the other transmitters; and
    for each of the plurality of transmitters, vectorially adding the fixed beamforming output and the MIMO output for that transmitter.

4. The method of claim 3, wherein vectorially adding the fixed beamforming output and the MIMO output includes combining the outputs in the analog domain using a phase rotator to produce a combined signal.

5. The method of claim 4, further including amplifying the combined signal, including using an amplifier to apply different levels of transmit power using pre-distortion compensation of a non-linear gain characteristic.

6. The method of claim 1, wherein transmitting the radar signals includes:
    generating a fixed beamforming output;
    generating variable MIMO outputs for each of a plurality of transmitters, the MIMO output for each transmitter having a phase pattern that is different than the phase pattern of the MIMO output of another of the transmitters; and
    for each of the plurality of transmitters via which the radar signals are transmitted, transmitting the radar signals as a vectorial addition of the fixed beamforming output and the MIMO output for that transmitter.

7. The method of claim 1, wherein generating the radar signals having both scanning and fixed beam signal codes includes generating respective signals exhibiting different phase rotations.

8. The method of claim 1, wherein processing the reflections of the radar signals includes:
    decoding the transmitted radar signals; and
    for each decoded radar signal, identifying one of a plurality of transmitters from which the radar signal is received based on characteristics selected from the group of:
        scanning and fixed beam signal codes used for the respective transmitters, a beamforming code and related Doppler offsets of the respective transmitters, and a combination thereof.

9. The method of claim 1, wherein generating the radar signals includes vectorially adding the scanning and fixed beam analog signal codes.

10. The method of claim 1, wherein generating the radar signals includes providing scanning and fixed beam outputs to an analog signal generator and combining the outputs to produce the radar signals having both scanning and fixed beam signal codes.

11. The method of claim 1, wherein:
    transmitting the radar signals includes generating the radar signals to produce the reflections having different values in the Doppler frequency domain, each value corresponding to a unique Doppler shift exhibited by a transmitter from which the radar signals are transmitted; and
    processing reflections of the radar signals includes identifying the transmitter from which the reflections of the radar signals are transmitted.

12. An apparatus comprising:
    transmission circuitry to transmit radar signals, including generating and transmitting radar signals using both scanning and fixed beam analog signal codes concurrently for each radar signal, wherein the analog signal codes comprise codes that are combined in the analog domain; and
    processing circuitry including positional assessment circuitry to process the reflections of the radar signals from a target and, in response thereto, ascertain positional characteristics of the target.

13. The apparatus of claim 12, wherein the transmission circuitry is to generate the radar signals by:
- generating a fixed beamforming output;
- generating variable MIMO outputs, each MIMO output having a phase pattern that is different than the phase pattern of the other MIMO outputs; and
- combining the fixed beamforming output and one of the MIMO outputs to provide a radar signal to be transmitted.

14. The apparatus of claim 12, wherein the transmission circuitry is to generate the radar signals by:
- generating a fixed beamforming output;
- generating variable MIMO outputs for each of a plurality of transmitters, the MIMO output for each transmitter having a phase pattern that is different than the phase pattern of the MIMO outputs for the other transmitters; and
- for each of the plurality of transmitters, vectorially adding the fixed beamforming output and the MIMO output for that transmitter.

15. The apparatus of claim 14, wherein:
- the transmission circuitry is to vectorially add the fixed beamforming output and the MIMO output by combining the outputs in the analog domain using a phase rotator to produce a combined signal; and
- the transmission circuitry includes an amplifier to amplify the combined signal by applying different levels of transmit power using pre-distortion compensation of a non-linear gain characteristic.

16. The apparatus of claim 12, wherein the transmission circuitry is to transmit the radar signals by:
- generating a fixed beamforming output;
- generating variable MIMO outputs for each of a plurality of transmitters, the MIMO output for each transmitter having a phase pattern that is different than the phase pattern of the MIMO output of another of the transmitters; and
- for each of the plurality of transmitters via which the radar signals are transmitted, transmitting the radar signals as a vectorial addition of the fixed beamforming output and the MIMO output for that transmitter.

17. The apparatus of claim 12, wherein the processing circuitry is to process the reflections of the radar signals by:
- decoding the transmitted radar signals; and
- for each decoded radar signal, identifying one of a plurality of transmitters from which the radar signal is received based on the scanning and fixed beam signal codes used for the respective transmitters.

18. The apparatus of claim 12, wherein the transmission circuitry is to generate the radar signals by:
- providing scanning and fixed beam outputs to an analog signal generator; and
- vectorially adding the scanning and fixed beam analog signal codes to produce the radar signals concurrently exhibiting both scanning and fixed beam signal codes.

19. The apparatus of claim 12, wherein:
- the transmission circuitry is to transmit the radar signals by generating the radar signals to produce the reflections having different values in the Doppler frequency domain, each value corresponding to a unique Doppler shift exhibited by a transmitter from which the radar signals are transmitted; and
- the processing circuitry is to process the reflections of the radar signals includes identifying the transmitter from which the reflections of the radar signals are transmitted.

20. The apparatus of claim 12, wherein the transmission circuitry is to generate the radar signals by generating respective scanning and fixed beam signal codes exhibiting different phase rotations.

* * * * *